(12) United States Patent
Buerkle et al.

(10) Patent No.: US 9,308,916 B2
(45) Date of Patent: Apr. 12, 2016

(54) DRIVER-ASSISTANCE SYSTEM AND METHOD FOR OPERATING THE DRIVER-ASSISTANCE SYSTEM

(71) Applicant: Robert Bosch GmbH, Stuttgart (DE)

(72) Inventors: Lutz Buerkle, Stuttgart (DE); Ruediger Jordan, Stuttgart (DE)

(73) Assignee: ROBERT BOSCH GMBH, Stuttgart (DE)

(*) Notice: Subject to any disclaimer, the term of this patent is extended or adjusted under 35 U.S.C. 154(b) by 0 days.

(21) Appl. No.: 14/423,632

(22) PCT Filed: Jul. 9, 2013

(86) PCT No.: PCT/EP2013/064431
§ 371 (c)(1),
(2) Date: Feb. 24, 2015

(87) PCT Pub. No.: WO2014/029549
PCT Pub. Date: Feb. 27, 2014

(65) Prior Publication Data
US 2015/0224988 A1 Aug. 13, 2015

(30) Foreign Application Priority Data
Aug. 24, 2012 (DE) .................. 10 2012 215 093

(51) Int. Cl.
*G08G 1/00* (2006.01)
*B60W 30/095* (2012.01)
(Continued)

(52) U.S. Cl.
CPC ............ *B60W 30/0956* (2013.01); *B60Q 9/008* (2013.01); *B60R 21/0134* (2013.01); *B60T 7/22* (2013.01); *B60W 50/14* (2013.01); *B62D 15/0265* (2013.01); *B60W 30/18163* (2013.01)

(58) Field of Classification Search
CPC ............ B60W 30/0956; B60W 50/14; B60W 30/18163; B60T 7/22; B62D 15/0265; B60Q 9/008; B60R 21/0134
See application file for complete search history.

(56) References Cited

U.S. PATENT DOCUMENTS 6,813,555 B1 * 11/2004 Kerner ................. G08G 1/0104
701/117
9,035,797 B2 * 5/2015 Varma ............... G08G 1/096783
340/905

(Continued)

FOREIGN PATENT DOCUMENTS

EP 1475765 11/2004
EP 1977946 10/2008

OTHER PUBLICATIONS

International Search Report for PCT/EP2013/064431, issued on Oct. 2, 2013.

*Primary Examiner* — Mary Cheung
(74) *Attorney, Agent, or Firm* — Kenyon & Kenyon LLP (57) ABSTRACT

A method for operating a driver-assistance system for a vehicle traveling on a road is described, which includes the steps:
  detecting a bottleneck lying ahead of the vehicle as well as at least one vehicle that approaches the vehicle from the opposite direction,
  determining the distance and the width of the bottleneck as well as the distance, the width, and the current driving speed of the oncoming vehicle,
  predicting the expected trajectories of the vehicle and the oncoming vehicle, and determining an expected meeting point of the two vehicles,
  analyzing the predicted traffic situation, and
  activating a safety function if the expected meeting point of the two vehicles lies in the region of the bottleneck (500), the activation instant of the safety device (150) being determined as a function of the current traffic situation.

10 Claims, 7 Drawing Sheets

(51) Int. Cl.
*B60W 50/14* (2012.01)
*B60T 7/22* (2006.01)
*B62D 15/02* (2006.01)
*B60Q 9/00* (2006.01)
*B60R 21/0134* (2006.01)
*B60W 30/18* (2012.01)

(56) References Cited

U.S. PATENT DOCUMENTS

| | | | | |
|---|---|---|---|---|
| 2007/0299595 A1* | 12/2007 | Boldin | ................ | G08G 1/0104 701/117 |
| 2012/0109454 A1* | 5/2012 | Fischer | ................ | B60Q 1/484 701/36 |
| 2013/0138320 A1* | 5/2013 | Aso | ................ | B60W 30/16 701/96 |
| 2013/0144516 A1* | 6/2013 | Sato | ................ | G08G 1/0112 701/118 |

* cited by examiner

DRIVER-ASSISTANCE SYSTEM AND METHOD FOR OPERATING THE DRIVER-ASSISTANCE SYSTEM

BACKGROUND INFORMATION

Driver-assistance systems are used in order to support the driver or user of a vehicle in different traffic situations. For example, driver-assistance systems can warn the driver of looming collisions or perform automatic braking if a dangerous traffic situation has been detected. These collision warning systems essentially consider vehicles or objects that are either standing on the road or are moving on the road in the same direction as the own vehicle. The known driver-assistance systems are also already able to take oncoming traffic into account. For example, this is the case in what is known as the left-turn assistant, which implements automatic emergency braking if an acute collision danger with an oncoming vehicle is determined in a left turn. A passing assistant, on the other hand, warns the driver if a collision danger with oncoming traffic exits during a passing maneuver. This system, too, ultimately carries out automatic braking if the driver does not abandon the risky passing maneuver.

A basic problem inherent in the warning driver-assistance functions is that said warnings are to be output only if the driver is in actual need of support. The reason for this is that excessive warnings may annoy the driver and ultimately lead to a deactivation of the system by a user intervention. In the same way, a driver-assistance system that outputs such warnings too infrequently in situations in which the vehicle driver needs assistance, results in similar irritation of the vehicle driver.

Predicting the movement of the own and a second vehicle over multiple seconds typically constitutes a very significant challenge for a driver-assistance system. If the prediction is incorrect, the driving situation is used incorrectly and an incorrect system response is executed or fails to be executed as a result (false positive or false negative). The concepts for predicting the vehicle movements used heretofore are based on simple movement models, e.g., the vehicle is moving along a straight line or a circular path at a constant speed or acceleration, which may possibly allow no precise prediction of the traffic situation and therefore lead to incorrect system reactions with relative frequency. This may result in unintended system reactions, especially when bottlenecks and oncoming traffic are encountered.

SUMMARY

Therefore, it is an object of the present invention to improve the predictability of potential collisions in vehicles that are traveling on roads featuring bottlenecks and oncoming traffic. This objective is achieved by a method for operating a driver-assistance system and by a driver-assistance system.

In the method for operating a driver-assistance system according to the present invention for a vehicle driving on a road, a bottleneck situated ahead of the vehicle and at least one vehicle approaching the vehicle from the opposite direction are detected. The distance and width of the bottleneck and the distance, width, current driving speed and the current driving direction of the oncoming vehicle are then ascertained. Based on these data, the expected trajectories of the vehicle and the oncoming vehicle are predicted or calculated, and an expected meeting point of the two vehicles is determined. The predicted traffic situation is then analyzed and a safety device is activated if the expected meeting point of the two vehicles lies in the region of the bottleneck; the instant at which the safety device is activated is determined as a function of the current traffic situation. The forecast or prediction of the expected trajectories of the two vehicles and the subsequent determination of their expected meeting point enables a statement about the collision risk of these vehicles in the region of the bottleneck. If a collision danger is detected, appropriate safety measures are able to be taken automatically, such as the output of a warning or an intervention in the vehicle handling. The variable determination of the instant at which the safety device is activated makes it possible to reduce the number of false warning messages or interventions in the vehicle handling.

In one specific embodiment, the activation of the safety device is delayed if the bottleneck is caused by an obstacle that is allocated to a traffic lane of the oncoming vehicle. In so doing, it is taken into account that the oncoming traffic, when approaching the obstacle situated in its traffic lane, typically implements appropriate safety measures to avoid a collision of the two vehicles in the region of the bottleneck. Therefore, it is possible to initially postpone the activation of the safety device in the own vehicle until a renewed check of the traffic situation reveals that the oncoming vehicle is not responding, or is responding insufficiently or too late, to reliably avoid a collision of the vehicles in the region of the bottleneck. However, if after delaying the activation of the safety system, the driver-assistance system determines that the oncoming vehicle is taking appropriate measures to avoid a collision, such as braking or accelerating, the activation of the safety device may be suppressed completely. System reactions that are considered unnecessary are avoided in this case.

According to a further specific embodiment, the activation of the safety device is delayed if the bottleneck is due to an obstacle that cannot unambiguously be assigned either to a traffic lane of the vehicle or to a traffic lane of the oncoming vehicle. In this case, too, it may be assumed that the oncoming vehicle will avoid a potential vehicle collision in the region of the bottleneck by an appropriate measure. The early activation of the safety device is therefore able to be delayed or postponed until the behavior of the oncoming vehicle and the possibly required own reaction become clear at a later point in time. Unnecessary system reactions that may lead to irritation or distraction of the vehicle driver are therefore able to be effectively avoided.

In another specific embodiment, the safety device is activated immediately if the bottleneck is due to an obstacle in a traffic lane allocated to the vehicle. The early activation of the safety device allows the own vehicle to react as rapidly as possible and thereby reduces the risk of a collision in the region of the bottleneck.

In another specific embodiment, the safety measure is not executed or the safety device is not activated if the ascertained traffic lane width in the region of the bottleneck exceeds a minimum width that is defined by the sum of the widths of the two vehicles and an additional safety clearance. Checking the minimum width ensures that no unnecessary safety measures are performed or no unnecessary activations of the safety devices take place if the bottleneck is passable using a comfortable driving style.

In a further specific embodiment, the activation of the safety device causes an optical, an acoustic and/or a haptic warning signal to be output to a user of the vehicle, automatic braking and/or accelerating of the vehicle to take place and/or steering support (steering moment) to be provided. With the aid of the warning signal the vehicle user can be made aware of the looming collision in a timely manner. Automatic braking or accelerating of the vehicle, on the other hand, constitutes an intervention in the vehicle handling and thus an active defense against the danger.

In a further specific embodiment, the forecasting of the expected trajectories of the two vehicles takes place under consideration of at least one assumption that takes the typical behavior of the vehicle driver into account. For example, it may be assumed that the vehicle always follows the road and/or always drives along the edge of the road. It may furthermore be assumed that the vehicle drives as closely as possible to the edge of the traffic lane allocated to the vehicle. According to another assumption, the vehicle evades an obstacle that projects into the traffic lane allocated to the vehicle. Furthermore, according to another assumption, the vehicle always moves within a comfort region and/or drives at a constant speed. The aforementioned assumptions constitute typical behaviors of drivers, whose consideration in the forecasting of the expected trajectories thus leads to improved predictions of future vehicle movements, and thus to better forecasting of potential vehicle collisions, as well. As a result, the consideration of the aforementioned assumptions reduces meaningless warnings or unnecessary or even dangerous interventions of the driver-assistance system in the vehicle handling.

In another specific embodiment, the decision whether a safety device will be activated, which safety measure will be activated, and/or at which time the safety device will be activated is made as a function of the vehicle speed or the speed of the oncoming vehicle. In this way it is possible to take into account that a vehicle driver is able to detect a dangerous traffic situation earlier at a low driving speed than at a high vehicle speed and is able to take countermeasures in a timely manner. For example, at a low driving speed or low relative speed between the vehicle and the oncoming vehicle, the system reaction may initially delay the activation of the safety measure and possibly prevent it altogether, without increasing the risk of the occurrence of a dangerous traffic situation.

In a further specific embodiment, the activation of the safety device is abandoned if a corresponding user intervention is detected. This ensures that the vehicle driver retains control of the vehicle, which manifests itself in the form of a greater safety feeling, especially in automatic interventions in the vehicle handling such as braking or decelerating, for instance.

DETAILED DESCRIPTION

Figure 1:
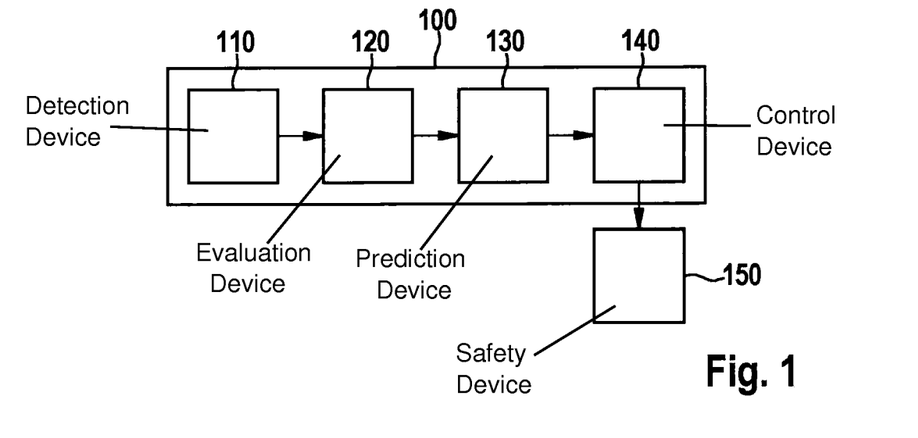
FIG. 1 schematically, a driver-assistance system according to the present invention.

FIG. 1 shows a driver-assistance system 100 according to the present invention in a schematic representation. Driver-assistance system 100 includes multiple functional blocks 110 to 150, which represent individual functionalities or functionality levels of driver-assistance system 100. Depending on the design, the individual functionalities may be integrated in the form of separate functional units or be integrated together with other functionalities in a shared functional unit in software and hardware form. First functional block 110 represents a detection device having a surround sensor system for detecting the traffic environment of the vehicle. The surround sensor system may include different sensing and detection devices which detect objects in the environment of vehicle 300 and determine characteristics of the detected objects. Different measuring methods may be used, such as video, radar, lidar, sonar, etc. All suitable detection and measuring methods are basically conceivable for this purpose.

Second functional block 120 represents the evaluation device, in which a surroundings description based on the data detected by the surround sensor system takes place. For example, the road course, the road edge, obstacles on the road or other road users are ascertained. The distance and width of the bottlenecks caused by one or more obstacle(s), as well as the distance, current driving speed and the current driving direction of the vehicles detected by the surround sensor system are determined as well.

Based on this information, an analysis of the traffic situation and a forecast of future object movements take place in a prediction device represented by functional block 130. Toward this end, the prediction device predicts the expected trajectories of the own vehicle and of the detected oncoming vehicles and uses these expected trajectories to ascertain an expected meeting point of the vehicles.

The future traffic situation predicted in this manner is analyzed in a control device represented by functional block 140 and is subsequently utilized to plan the system reaction. Control device 140 activates at least one external safety device 150 as a function of the analysis result of the traffic situation. The safety device illustrated by fifth functional module 150, for example, is the vehicle brake for a direct intervention in the vehicle handling, a steering moment or an acoustic, optical or haptic signal transmitter for outputting a warning signal to the vehicle driver.

Driver-assistance system 100 is designed to warn the driver of vehicle 200 of an impending collision in the region of a bottleneck, or to implement automatic braking if oncoming traffic is present and the bottleneck is not wide enough for two vehicles next to each other. Prediction device 130 includes a prediction model, with the aid of which it is possible to predict the movement of the own vehicle and the movement of the oncoming vehicle at the bottleneck as realistically as possible. On this basis, a reaction pattern implemented in control device 140 is used to decide whether a safety device is to be activated, which particular safety device is to be activated, and at which point in time the safety device is to be activated. Both the prediction model of prediction device 130 and the reaction pattern of control device 140 are set up to provide not only high functional use but, if possible, to avoid incorrect warnings or inappropriate brake interventions at the same time.

Figure 2:
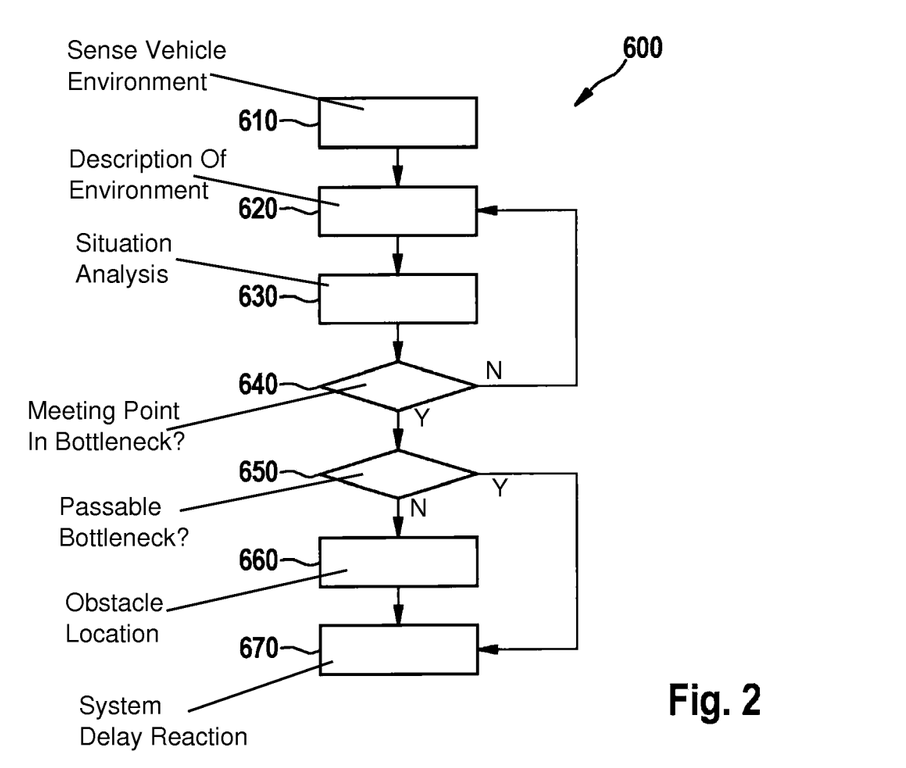
FIG. 2 schematically, the sequence of the method according to the present invention.

The method running in driver-assistance system 100, from the detection of the vehicle surroundings up to a system reaction that is appropriate for the individual traffic situation, is described in greater detail in FIG. 2 with the aid of a simplified flow chart 600. In a first step 610, the environment of the vehicle is sensed using appropriate methods, so that the road course, the roadway or traffic lane boundaries as well as traffic objects and obstacles situated on the road are detected. In principle, different measuring, detection and acquisition methods may be used for this purpose. For example, the vehicle environment is detectable with the aid of one or more camera(s) or other optical sensors. Furthermore, laser-, radar- or sound-wave-based measuring and detection systems may allow a sufficiently precise detection of the vehicle environment.

In a second method step 620, the description of the vehicle environment takes place, for which the detected measuring data are analyzed and the desired information, e.g., the road course, road edge, traffic objects and objects situated in the road or in the traffic lane(s), is determined. The description of the environment preferably is made with the aid of a suitable computing device, in which appropriate algorithms for analyzing the measurement data and for ascertaining the vehicle environment are implemented in software and/or hardware. To obtain an accurate idea of the current traffic situation in the environment of the vehicle, as much information as possible is preferably determined from the measurement data. For example, in addition to the road course, the road boundaries, the position, speed and driving direction of the other road users and, in particular, of the oncoming vehicles, as well as the position of obstacles in the region of the roadway, possibly also the width of the oncoming vehicles and the width of a detected bottleneck are ascertained for this purpose.

Based on the data obtained when describing the environment, a situation analysis takes place in a further method step 630, in which the instantaneous traffic situation is analyzed and a forecast or prediction of future object movements takes place. The expected trajectories (setpoint trajectories) of the own vehicle, the detected oncoming vehicles and possibly also of other objects that were identified as moving traffic objects in the region of roadway 200, are calculated based on the available data, e.g., the vehicle speed and driving direction. In the process, the road course, corresponding evasive maneuvers in the case of obstacles in the own traffic lane and possibly also a number of typical behavior patterns of the involved road users are taken into account. This is done with the aid of the prediction device or the prediction module, which is realized in driver-assistance system 100 in the form of software and/or hardware. The prediction of the setpoint trajectories is implemented at least up to the point at which the own vehicle and the oncoming vehicle are at the same level. The location, calculated with the aid of the trajectories, at which the vehicles encounter each other at the same level defines the expected meeting point of the two vehicles.

In order to be able to predict the future traffic situation more precisely, the calculation of expected trajectories 310, 410 of vehicles 300, 400 may take place while taking the following marginal conditions into account. For one, it may be assumed that one or both vehicle(s) 300, 400 follow(s) the road or, if possible, drive(s) along road edge 230, 240 assigned to the own traffic lane 210, 220 in each case. It may furthermore be assumed that vehicles 200, 300 are driving to the right, if possible. The assumption that vehicles 300, 400 always evade obstacles that project into the traffic lane assigned to the respective vehicle may also be taken into consideration. Within the scope of the prediction, it may furthermore be assumed that the vehicles, if possible, move within the comfort range, i.e., with limited transversal acceleration. Finally, it may be assumed that vehicles 300, 400 are traveling at a constant speed.

The advantage of this method is that object movements are able to be predicted in a clearly more realistic manner, taking the vehicle environment into account (i.e., considering roadway boundaries such as curbstones, stationary obstacles such as parking vehicles, etc.), than would be possible when using a relatively simple, linear or circular movement model. Such simple movement models merely describe linear motion or a motion along a circular path at a constant speed or acceleration. Because of the more precise, and thus more realistic, description of the object movements, incorrect reactions of the driver-assistance system, such as incorrect warnings or even unnecessary interventions in the vehicle handling are able to be reduced considerably.

In system terms, the following method steps are to be assigned to the action-planning functional module 140 from FIG. 1, in which an evaluation of the predicted traffic situation with regard to the existence of a collision risk and a decision or the planning of the corresponding system reaction take place. In a method step 640, it is first ascertained whether expected meeting point 240, determined in prediction module 130, of the two vehicles 300, 400 lies in the region or at the level of roadway bottleneck 500. If this is not the case, no collision risk exists and thus also no need for a corresponding system reaction. In this case, a renewed referring to the analysis of the data ascertained by the sensor system in method step 620, is possible via an intermediate step 645, in which the absence of a collision risk is determined. This is shown in FIG. 2 by way of example by corresponding arrows that connect method steps 640, 645, 620. However, if driver-assistance system 100 has determined in method step 640 that predicted meeting point 250 of the two vehicles 300, 400 lies in the region or at the level of bottleneck 500, there is the basic risk that both vehicles 300, 400 will collide with each other in the region of bottleneck 500. This is the case especially when the passability of bottleneck 500 is not ensured because of the width of the two vehicles 300, 400. Therefore, the passability of bottleneck 500 is examined in a further method step 650. To do so, the previously determined width of bottleneck $b_3$ is compared to the sum of width $b_1$, $b_2$ of the two vehicles 300, 400. Passability of bottleneck 500 may be assumed if roadway bottleneck width $b_3$ corresponds at least to a minimum width $b_{min}$, which corresponds to the sum of width $b_1$ of own vehicle 300, width $b_2$ of oncoming vehicle 400, and an additional safety clearance $b_3$. Safety clearance $b_3$ may be both fixedly defined and also always be determined anew according to the situation, for instance based on vehicle speeds $v_1$, $v_2$, the road width and the road course. Other information such as the type of vehicle may be taken into account, as well.

If the check reveals that ascertained road width $b_3$ in the region of bottleneck 500 is not below minimum width $b_{min}$, system 100 determines in an intermediate step 645 that no direct collision risk exists and again refers to a previous method step, e.g., method step 620.

However, if the system determines that the width of lane $b_3$ formed by the bottleneck is below minimum width $b_{min}$, then a collision continues to be assumed and the method is continued with regard to an activation of the safety function. At this point, it may also be checked in an intermediate step 660 whether ascertained obstacle 510, 520, 530 is located in own traffic lane 210, or is able to be unequivocally allocated to own traffic lane 210. If this is not the case, system 100 determines a direct collision danger in an intermediate step 680. System 100 then executes an appropriate system reaction in method step 690. Especially the activation of an optical, acoustic or haptic warning signal and the activation of an intervention in the vehicle handling, especially the activation of automatic braking or steering of vehicle 300, are options in terms of the system reaction. The system reaction may be predefined or also be determined as a function of the situation. A graduated system reaction is possible as well, in which a warning signal is initially activated and an automatic braking operation of vehicle 300 is activated at a later point in time.

However, if it is determined in method step 660 that obstacle 250 is not situated in own traffic lane 210 or is unable to be unequivocally allocated to own traffic lane 210, system 100 may implement a predefined or situation-dependent certain delay in the system reaction, in an intermediate step 670. After the delay time provided by system 100 has elapsed, the system reaction may finally be implemented in method step 690. The system reaction, i.e., the activation of a safety function, is preferably merely suppressed and not completely deactivated.

However, it is useful to continue to check during the delay whether a changing traffic situation with regard to the collision danger has arisen in the meantime. For example, this may have happened because of braking, accelerating or a steering maneuver of oncoming vehicle 400 or of own vehicle 300. If the new traffic situation, or the expected traffic situation determined therefrom, indicates that a direct collision danger of the two vehicles 300, 400 no longer exists in the region of bottleneck 500, then the planned system reaction may be suppressed completely in method step 690, until a different evaluation of the collision danger results from a renewed analysis of the traffic situation.

Figure 3:
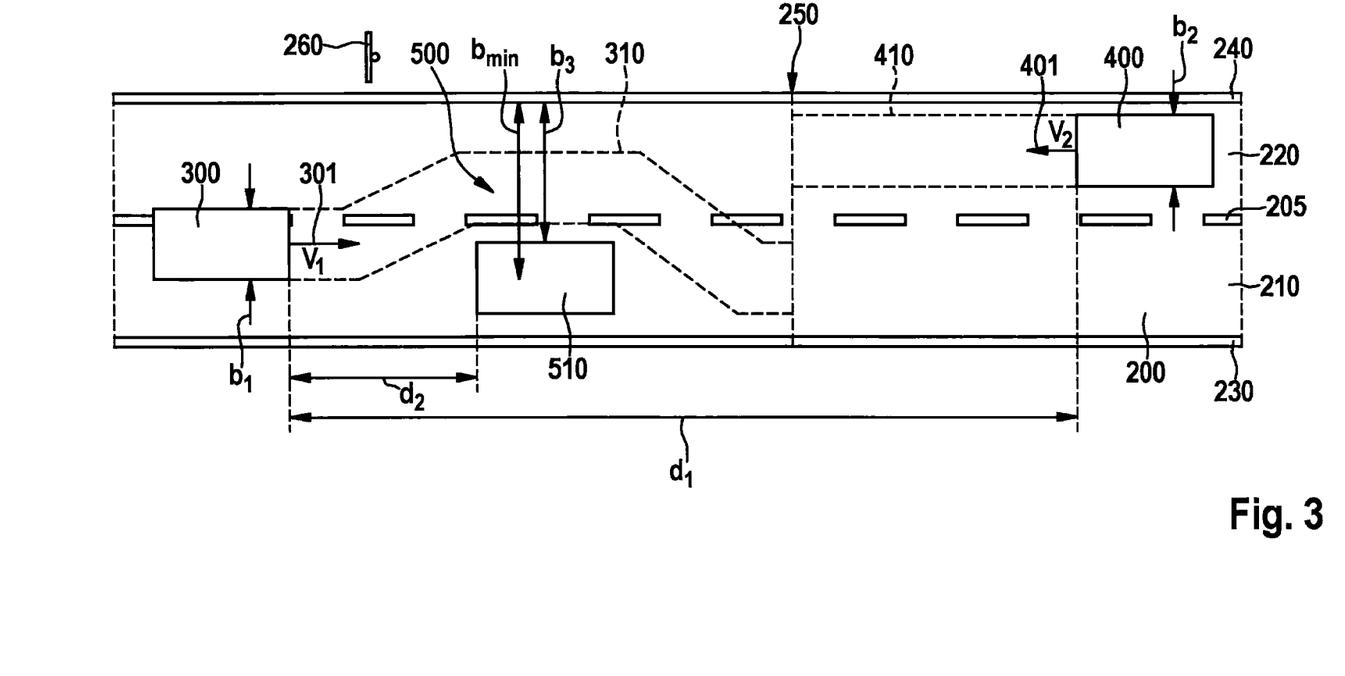
FIG. 3 schematically, a first traffic situation featuring oncoming traffic and a bottleneck that is passable without a collision.

In the following text, the method will be described on the basis of several typical traffic situations. FIG. 3 schematically illustrates a first traffic situation featuring two vehicles 300, 400 which are traveling along a straight section of a two-lane road 200. First vehicle 300 is the own vehicle (ego-vehicle) provided with driver-assistance system 100, and second vehicle 400 is a vehicle that is approaching own vehicle 300 in the oncoming lane. Both vehicles 300, 400 move in their own traffic lanes 210, 220, which are separated from each other by a typical solid center line in the present example.

As shown in FIG. 3, an obstacle 510, which blocks traffic lane 210 nearly completely, is located in traffic lane 210 of first vehicle 300. Obstacle 510, which, for instance, is an object located in traffic lane 200, a construction site, a street island, a stopped vehicle, a vehicle driving at low speed, or some other obstacle, leads to narrowing of the roadway or lane available for a passing operation. Since obstacle 510 is situated in own traffic lane 210, own vehicle 300 must enter oncoming traffic lane 220 in order to pass obstacle 510, whereas oncoming vehicle 400 is able to pass obstacle 510 in a virtually unhampered manner.

According to the present invention, a sensor system of own vehicle 300 detects obstacle 510 in traffic lane 200, oncoming vehicle 400 and, if present, also important traffic signs 260 by scanning or measuring the traffic environment, road 200 together with roadway demarcations 230, 240 and possibly existing traffic lane markings, such as center line 205. Driver-assistance system 100 then uses the measurement data to ascertain the current traffic situation, and in so doing, determines not only the position or distance $d_2$, driving speed $v_2$, driving direction 401 of oncoming vehicle 400, but its width $b_2$ as well. Furthermore, the position, distance $d_1$, width $B_3$ and possibly also the speed of obstacle 510 are determined too. When ascertaining the current traffic situation, it is also possible to take possibly detected traffic signs 260 into consideration in order to increase the accuracy of the subsequent prognosis. Among these, in particular, are right-of-way rules, passing prohibitions, speed limits or other warning signs that may be relevant for the traffic situation within a limited period of time.

Based on the current traffic situation and using a suitable prediction model, expected trajectory 310 or the setpoint trajectory of own vehicle 300 is subsequently calculated in advance or predicted for a certain period of time. The prediction takes place at least up to the point where vehicle 300 has passed obstacle 510 completely. Concurrently, the expected trajectory, or setpoint trajectory 410, of oncoming vehicle 400 is also calculated in advance. The prediction of trajectories 310, 410 preferably takes place up to the instant at which the two vehicles 300, 400 meet at the same level, or the two vehicles 300, 400 have passed each other. The location where the two vehicles 300, 400 meet results in meeting point 250, which is shown in FIG. 3 by a dashed line.

The prediction of trajectories 310, 410 preferably takes place with consideration of at least one of the following assumptions that reflect typical behaviors of the road users involved. For one, it may be assumed that individual vehicle 300, 400 always follows road 200 or drives along road edge 230, 240 assigned to own traffic lane 210, 220 in each case. It may furthermore be taken into account that individual vehicle 300, 400 is driving as closely as possible to road edge 230, 240 of traffic lane 210, 220 allocated to the vehicle. In addition, it may be taken into account that the particular vehicle 300, 400 invariably evades an obstacle that projects into traffic lane 210, 220 assigned to it. Also able to be considered is that individual vehicle 300, 400 is moving within a comfort range featuring low transversal acceleration, if possible. It may finally be taken into account that individual vehicle 300, 400 is traveling at a constant driving speed $v_1$, $v_2$.

By evaluating the predicted future traffic situation, driver-assistance system 100 is able to decide whether a system reaction is to take place and possibly what kind of system reaction is to take place. In the present exemplary embodiment, the resulting prediction is that expected meeting point 250 of the two vehicles 300, 400 occurs at an instant at which own vehicle 300 has already passed obstacle 510 completely. In this case the intervention of driver-assistance system 100 is not necessary, so that a corresponding system reaction may be omitted.

Figure 4:
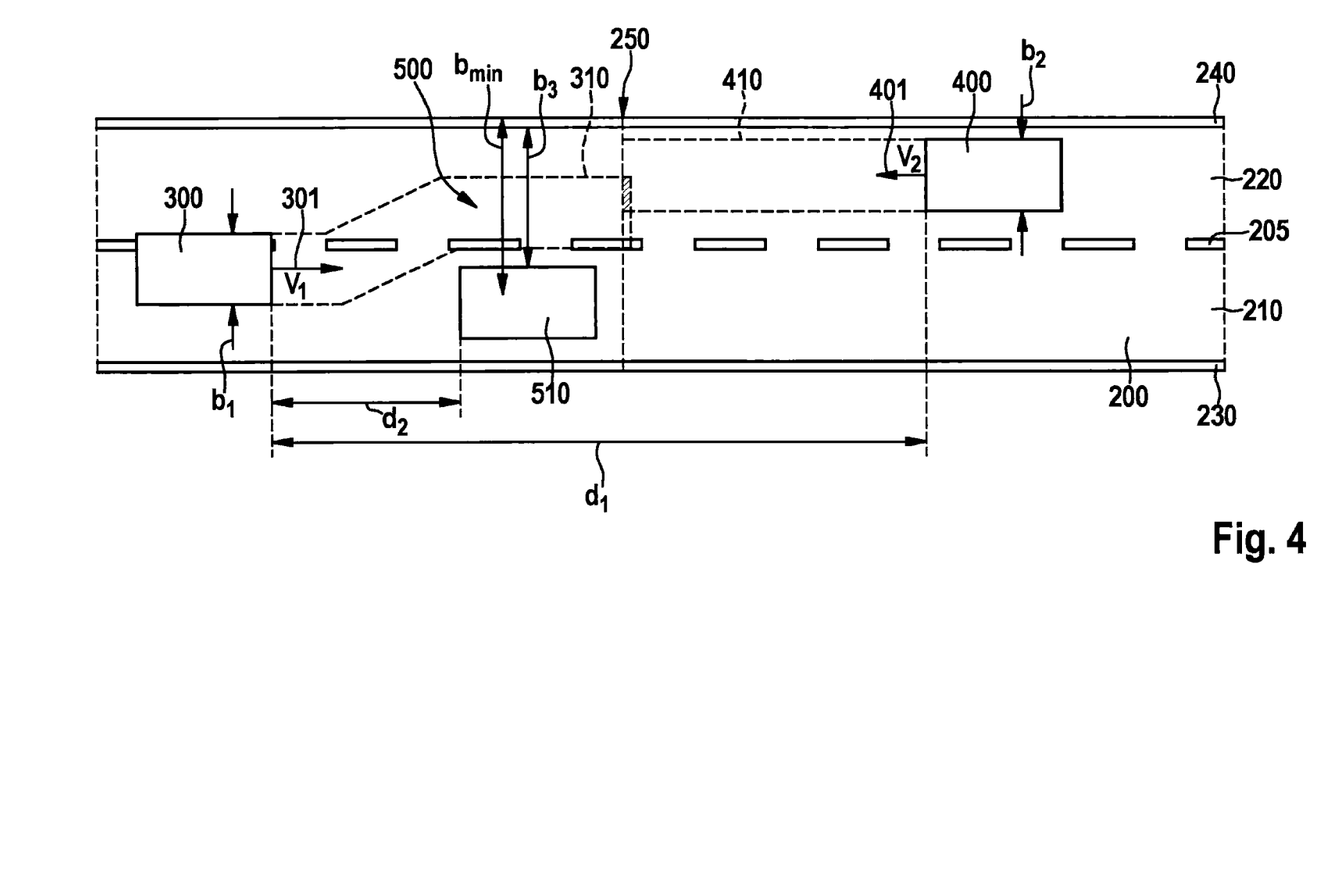
FIG. 4 schematically, a second traffic situation featuring oncoming traffic and a bottleneck that is impassable without a collision.

FIG. 4 schematically shows a similar traffic situation as the one shown in FIG. 3. However, in contrast to the afore-described traffic situation, distance $d_1$ of oncoming vehicle 400 from own vehicle 300 is shorter, so that meeting point 250 ascertained by the prediction of vehicle trajectories 310, 410 still lies in the region of obstacle 510. In other words, in contrast to the traffic situation from FIG. 3, own vehicle 300 is no longer able to fully pass obstacle 510 before encountering oncoming vehicle 400. Since ascertained width $b_3$ of bottleneck 500 or the driving lane, formed by obstacle 510, is below a minimum width $b_{min}$ that corresponds to the sum of width $b_1$ of the own vehicle, width $b_2$ of oncoming vehicle 400, and possibly a safety clearance $b_3$, a collision-free passing of bottleneck 500 by both vehicles 300, 400 is impossible in view of the current traffic situation. This means that a reaction of own vehicle 300 is required to prevent the looming collision with oncoming vehicle 400. Driver-assistance system 100 therefore activates a suitable system reaction, which in particular corresponds to the activation of an optical, acoustic and/or haptic warning signal, or to the intervention in the vehicle handling, such as braking of vehicle 300, for example.

Prior to activating the safety device, driver-assistance system 100 preferably checks whether detected obstacle 510 is able to be unequivocally allocated to own traffic lane 210. If this condition is met, as in the case at hand, driver-assistance system 100 carries out the scheduled system reaction without delay. A different assessment may result if the analysis of the traffic situation indicates that own vehicle 300 has the right of way, which may be indicated by corresponding traffic signs, for instance. In this case, the driver-assistance system may delay the pending system reaction until the danger point has been passed without any problem or until an imminently looming collision risk results based on a renewed analysis of the traffic situation.

Figure 5:
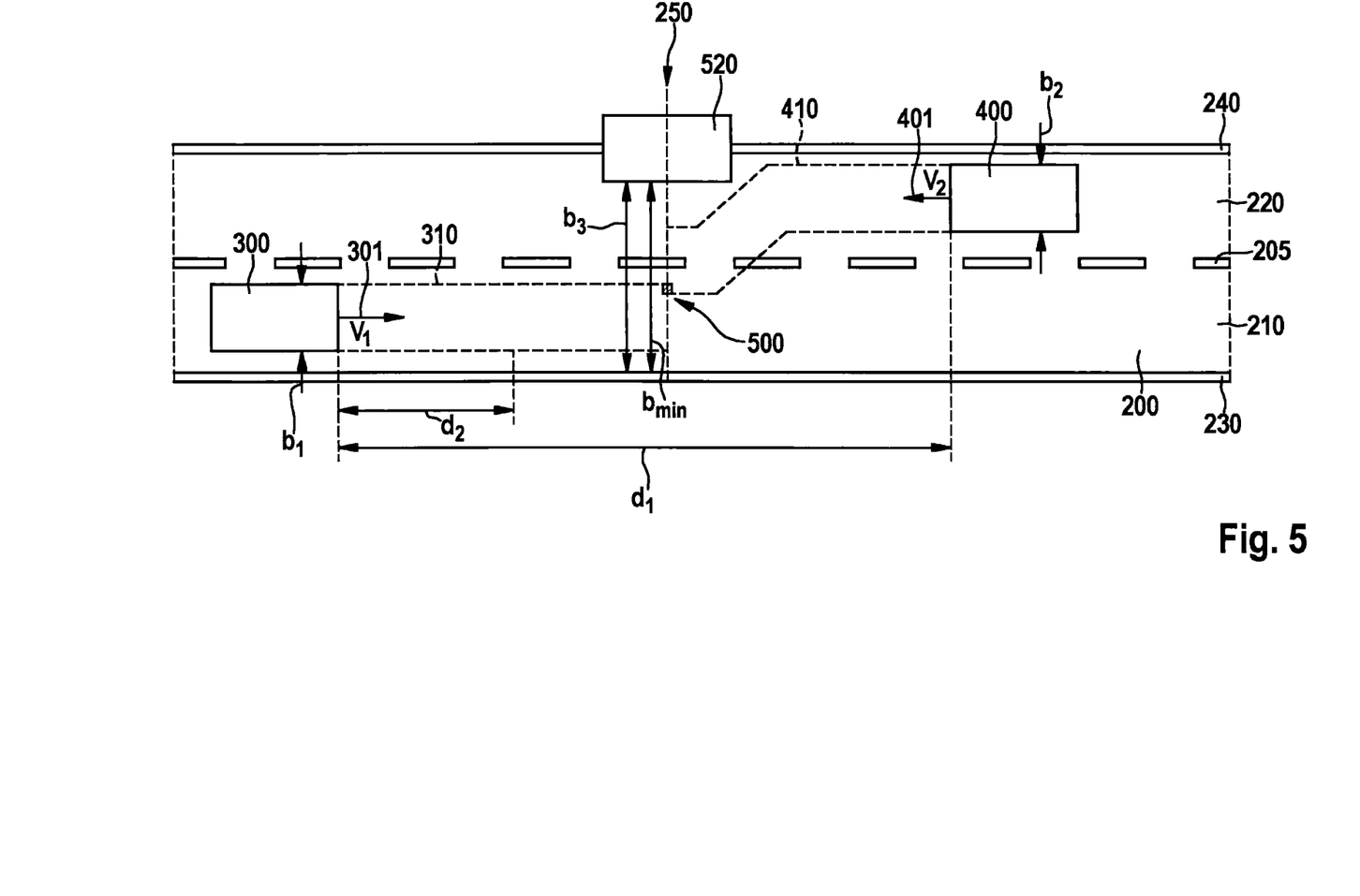
FIG. 5 schematically, a third traffic situation featuring oncoming traffic and a bottleneck that is not passable without a collision due to an obstacle projecting into the oncoming traffic lane.

However, a corresponding delay or suppression of the system reaction preferably takes place in cases where ascertained obstacle 520 is unable to be allocated to own traffic lane 210. FIG. 5 shows such an exemplary traffic situation, in which obstacle 520 is located in oncoming traffic lane 220. In this case, driver-assistance system 100 determines a looming collision based on the detection of the traffic environment, the ascertaining of the current traffic situation and the predicting of trajectories 310, 410 of vehicles 300, 400, since ascertained predicted meeting point 250 of the two vehicles 300, 400 lies directly in the region of bottleneck 500 and ascertained width $b_3$ of the road in the region of bottleneck 500 is less than minimum width $b_{min}$ formed by width $b_1$ of the own vehicle, width $b_2$ of oncoming vehicle 400, and safety clearance $b_3$. Therefore, driver-assistance system 100 will carry out the activation of a suitable safety measure, for instance the output of a warning or the intervention in the vehicle handling. Prior to this, however, it is analyzed, preferably on the basis of the traffic situation, whether a system reaction must occur immediately or whether the system reaction may be delayed. Since obstacle 520 is situated in oncoming traffic lane 220 in the case at hand and thus is not to be allocated to own traffic lane 210, the driver-assistance system will initially delay the activation of the provided safety measure, until a renewed analysis of the traffic situation indicates the need for a corresponding system reaction. If the further analysis reveals that a direct collision risk no longer exists in the region of bottleneck 500, for instance because oncoming vehicle 400 has braked on account of a right-of-way traffic rule, then driver-assistance system 100 is able to completely suppress the scheduled system reaction.

Figure 6:
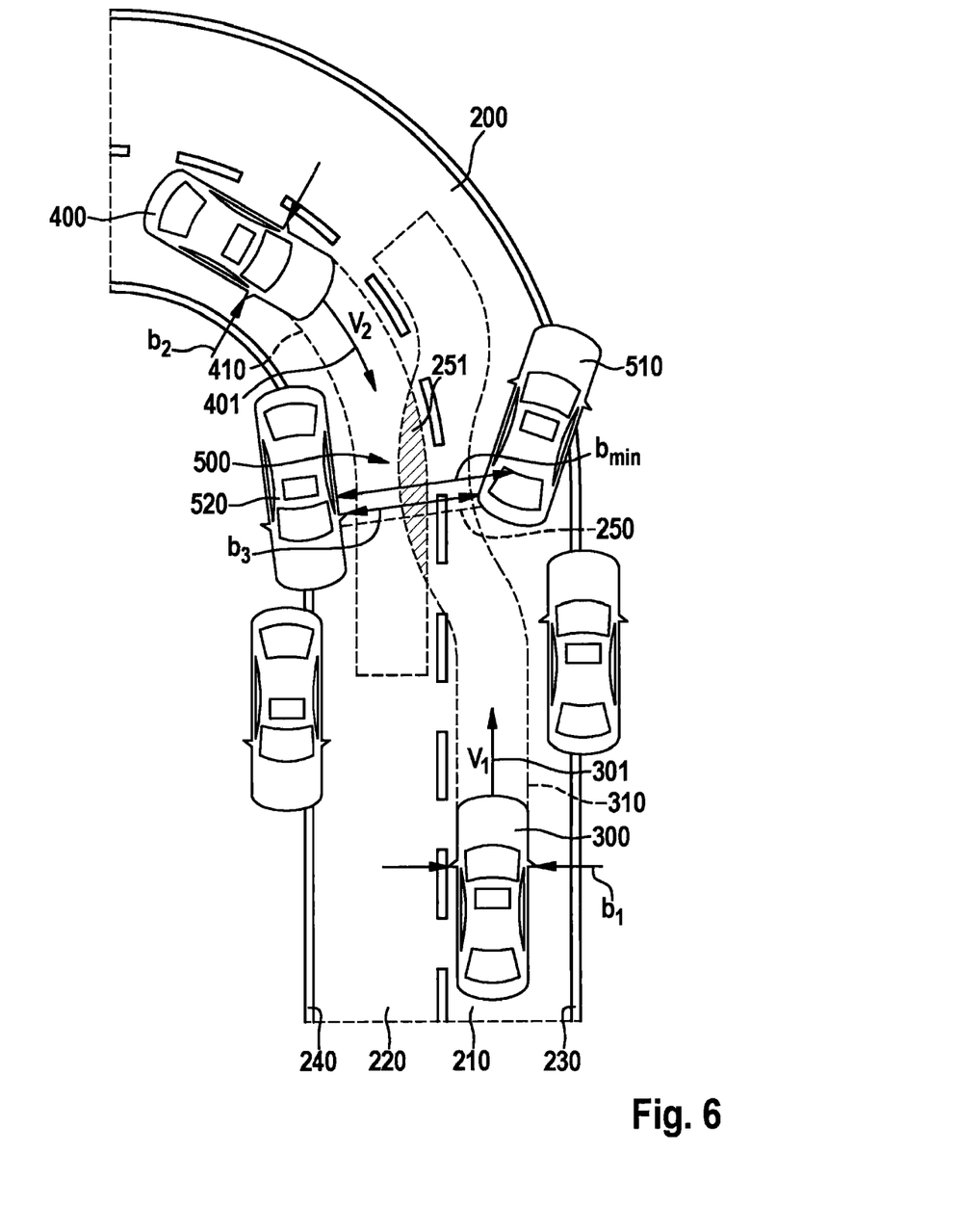
FIG. 6 a fourth traffic situation featuring a bottleneck due to two vehicles parked along both sides of the roadway, and oncoming traffic.

In contrast, FIG. 6 shows a traffic situation in which a bottleneck 500 has been created by obstacles situated in both traffic lanes 210, 220, such as by two parked vehicles 510, 520 in the case at hand. After detecting the vehicle surroundings, ascertaining the current driving situation and predicting trajectories 310, 410 of own vehicle 300 and oncoming vehicle 400, driver-assistance system 100 is able to localize expected meeting point 250 of the two vehicles 300, 400 in the region of bottleneck 500. Since ascertained width $b_3$ of the road in the region of bottleneck 500 is less than minimum width $b_{min}$ formed by width $b_2$ of oncoming vehicle 400, width $b_1$ of own vehicle 300, and an additional safety clearance $b_3$, it is impossible for both vehicles 300, 400 to pass bottleneck 500 without a collision. For this reason, driver-assistance system 100 of vehicle 300 will decide in favor of a system reaction, i.e., an activation of a safety measure. Prior to doing so, however, it is checked in an intermediate step whether the planned system reaction is able to be delayed. For this purpose it is analyzed whether bottleneck 500 is caused by an obstacle that is able to be allocated to own traffic lane 210. Since bottleneck 500 is caused both by an obstacle 510 in own lane 210 and by an obstacle 520 in traffic lane 220 of the oncoming traffic in the case at hand, it is possible to examine to what extent an evasive maneuver of vehicles 300, 400 into the respective oncoming traffic lane 210, 220 will be necessary. In the present example, the analysis indicates that only own vehicle 300 must switch lanes when passing bottleneck 500 due to obstacle 510 which projects heavily into own lane 210. In contrast, oncoming vehicle 400 is able to pass bottleneck 500 without switching to the other lane 210. Taking general right-of-way rules into account, system 100 will therefore carry out the system reaction right away, i.e., without corresponding delay.

Figure 7:
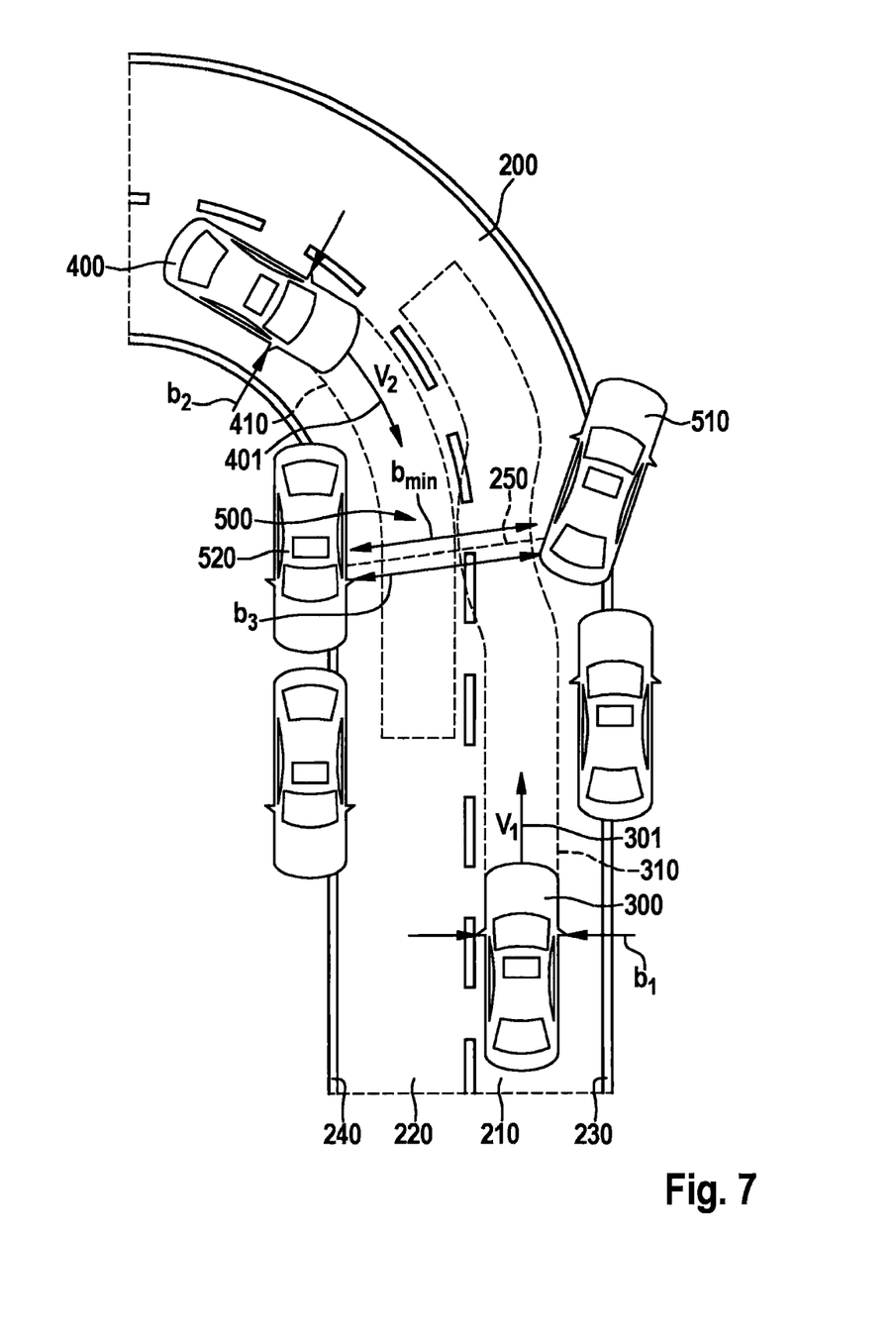
FIG. 7 a fifth traffic situation featuring a bottleneck created by vehicles parked along both sides of the roadway, but which is passable without a collision, and featuring oncoming traffic.

FIG. 7 shows a traffic situation that is similar to the traffic situation of FIG. 6, but width $b_3$ of bottleneck 500 now corresponds to minimum width $b_{min}$ that is required for the collision-free passing of bottleneck 500. The prediction of expected trajectories 310, 410 of the two vehicles 300, 400 therefore indicates that predicted meeting point 250 of the two vehicles 300, 400 does indeed lie in the region of bottleneck 500, but that predicted vehicle trajectories 310, 410 do not touch or intersect. In this case the driver-assistance system will therefore not carry out a corresponding system reaction, that is to say, will not activate a safety function.

Figure 8:
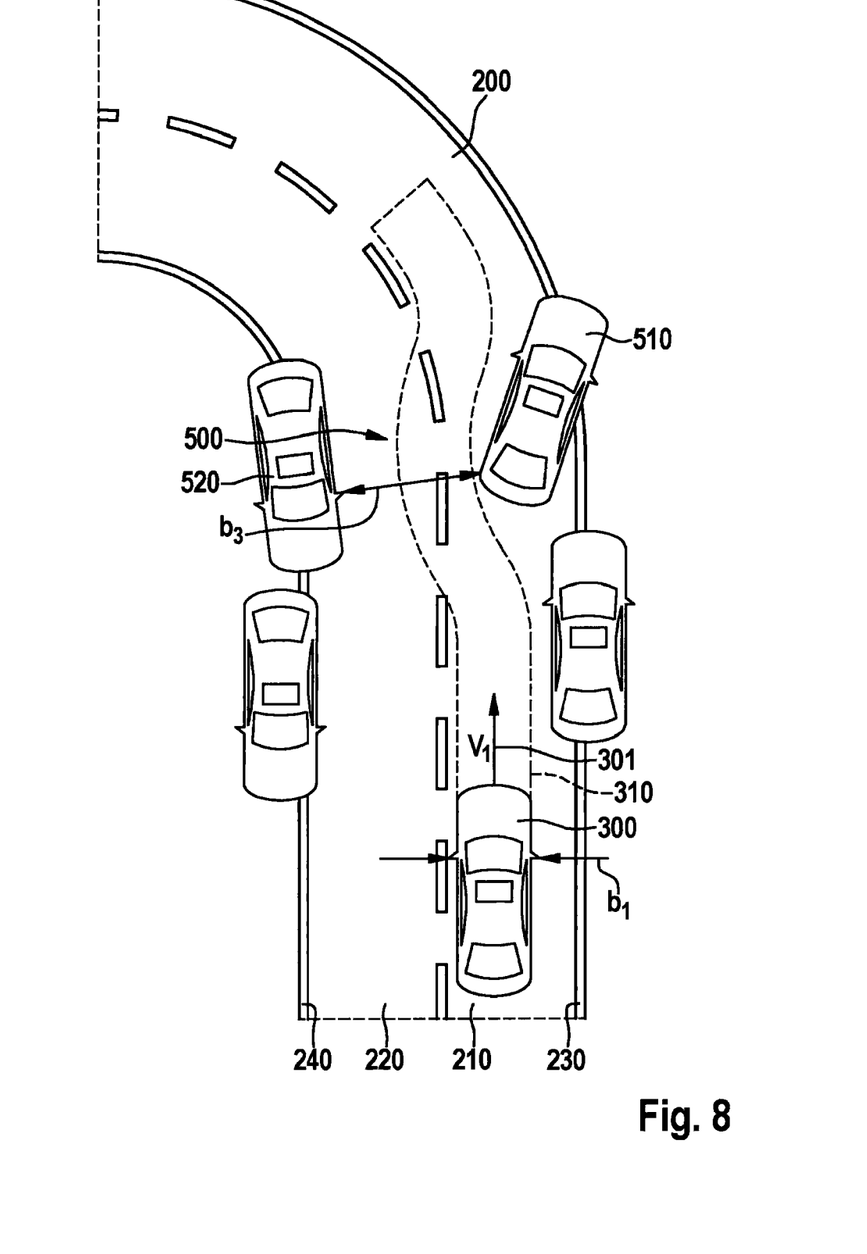
FIG. 8 a sixth traffic situation featuring a bottleneck due to vehicles parked along both sides of the roadway, without oncoming traffic.

FIG. 8 finally shows another change in the traffic situation of FIG. 6. Although detected width $b_3$ of bottleneck 500 is not wide enough to ensure the collision-free passing of two vehicles, driver-assistance system 100 forgoes a corresponding system reaction in this case as well because no oncoming vehicle 400 is detected in oncoming traffic lane 220.

The driver-assistance system described in connection with the figures does not involve an emergency braking function in the classic sense. Instead, the driver-assistance system is meant to provide steering assistance to the driver in difficult driving situations, i.e., when passing through bottlenecks. The driver is also to be supported if he or she has assessed the traffic situations incorrectly, e.g., if the bottleneck is narrower than expected. The support function of the driver-assistance system is also available to the driver if the vehicle gets into an uncomfortable driving trajectory. Through a certain steering moment at the steering wheel, the driver is then able to be provided with an indication as to how he can safely and comfortably pass through the bottleneck.

The term "safety device" primarily refers to an assistance device which supplies the driver with an acoustic, optical or haptic sign when an uncomfortable or dangerous driving or vehicle trajectory is detected. As an alternative or in addition to such, the assistance device may also automatically guide the vehicle onto a comfortable or safe driving trajectory by a supporting intervention in the linear or lateral guidance of the vehicle.

The specific embodiments, explained with the aid of the figures, represent merely preferred or exemplary specific embodiments of the present invention. Besides the specific embodiments described and illustrated, additional specific embodiments are conceivable, which may include further modifications as well as combinations of features.

What is claimed is:

1. A method for operating a driver-assistance system for a vehicle traveling on a road, comprising:
   detecting a bottleneck lying ahead of the vehicle as well as oncoming vehicle that approaches the vehicle from the opposite direction;
   ascertaining a distance and a width of the bottleneck as well as a distance, a width, and a current driving speed of the oncoming vehicle;
   predicting expected trajectories of the vehicle and the oncoming vehicle;
   ascertaining an expected meeting point of the vehicle and the oncoming vehicle, analyzing a predicted traffic situation; and activating a safety device if the expected meeting point of the vehicle and the oncoming vehicle lies in a region of the bottleneck, wherein an activation instant of the safety device is ascertained as a function of a current traffic situation.

2. The method as recited in claim 1, further comprising delaying the activation of the safety device if the bottleneck is caused by an obstacle in a traffic lane that is allocated to the oncoming vehicle.

3. The method as recited in claim 1, further comprising delaying the activation of the safety device if the bottleneck is due to an obstacle that cannot be unequivocally allocated either to a traffic lane of the vehicle or to a traffic lane of the oncoming vehicle.

4. The method as recited in claim 1, wherein the safety device is activated immediately if the bottleneck is caused by an obstacle in a traffic lane allocated to the vehicle.

5. The method as recited in claim 1, further comprising ascertaining a road width, wherein the activation of the safety device will not take place if the ascertained road width exceeds a minimum width in a region of the bottleneck, the minimum width being defined by a sum of the widths of the two vehicles and an additional safety clearance.

6. The method as recited in claim 1, wherein the safety device is activated in order to at least one of output at least one of an optical warning signal, an acoustic warning signal, and a haptic warning signal to a user of the vehicle, to implement at least one of an automatic braking and an acceleration of the vehicle, and to provide steering assistance.

7. The method as recited in claim 1, wherein a prediction model is used for predicting the expected trajectory of at least one of the two vehicles, which takes into account at least one of the following assumptions:

the particular vehicle at least one of follows the road and drives along a road edge, the particular vehicle drives as closely as possible to a lane edge of a traffic lane to which the particular vehicle is allocated, the particular vehicle evades an obstacle that projects into the allocated traffic lane, the particular vehicle moves within a comfort range, and the particular vehicle travels at a constant driving speed.

8. The method as recited in claim 1, wherein a decision at least one of whether the safety device will be activated, which safety device will be activated, and at which instant the safety device will be activated, is made as a function of at least one of a speed of the vehicle and a speed of the oncoming vehicle.

9. The method as recited in claim 1, wherein the activation of the safety device is abandoned if a corresponding user intervention is detected.

10. A driver-assistance system for a vehicle traveling on a road, comprising:

a detection device for detecting a bottleneck on the road lying ahead of the vehicle as well as at least one oncoming vehicle that approaches the vehicle from the opposite direction;

an evaluation device for determining a distance and a width of the bottleneck as well as a distance, a width, and a current driving speed of the oncoming vehicle;

a prediction device for predicting an expected trajectory for the vehicle and the oncoming vehicle, and for ascertaining an expected meeting point of the vehicle and the oncoming vehicle;

a control device for analyzing the predicted traffic situation and for activating a safety device in the event that the expected meeting point of the vehicle and the oncoming vehicle lies in a region of the bottleneck, wherein an activation instant of the safety device is ascertained as a function of a current traffic situation.

\* \* \* \* \*